April 26, 1960    J. E. BUXTON ET AL    2,933,926
ENGINE STARTER DRIVE
Filed Feb. 6, 1958

WITNESS:
Esther M. Stockton.

INVENTOR.
James E. Buxton
BY Raymond A. Gantert
Clinton L. James
ATTORNEY

United States Patent Office 2,933,926
Patented Apr. 26, 1960

2,933,926
ENGINE STARTER DRIVE

James E. Buxton and Raymond A. Gantert, Elmira, N.Y., assignors to Bendix Aviation Corporation, Elmira Heights, N.Y., a corporation of Delaware Application February 6, 1958, Serial No. 713,639

3 Claims. (Cl. 74—7)

The present invention relates to an engine starter drive of the automatic meshing and demeshing type, and more particularly to such a drive having load controlled means for accurately limiting the torque transmitted thereby.

It is an object of the present invention to provide a novel starter drive of this type which is efficient and reliable in operation, simple in construction and positive in action.

It is another object to provide such a device in which the torque limiting feature is in the form of a spring loaded friction coupling with load controlled means for relieving the pressure on the coupling members.

It is another object to provide such a device including spring means for compressing said coupling to build up its torque capacity beyond that necessary for the cranking operation, and load controlled means for opposing said coupling compressing means to thereby limit the torque capacity of the coupling.

Figure 1:
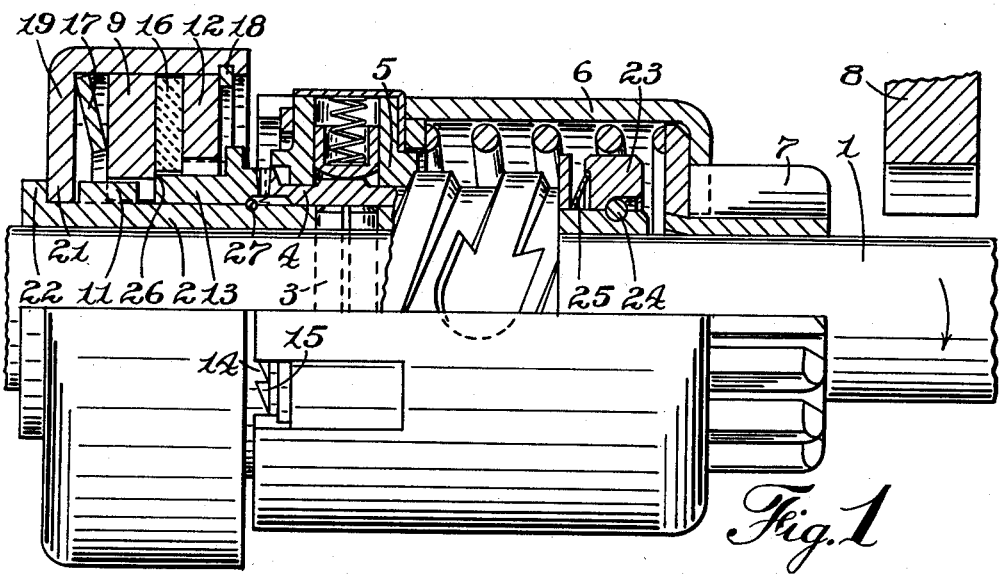
Figure 2:
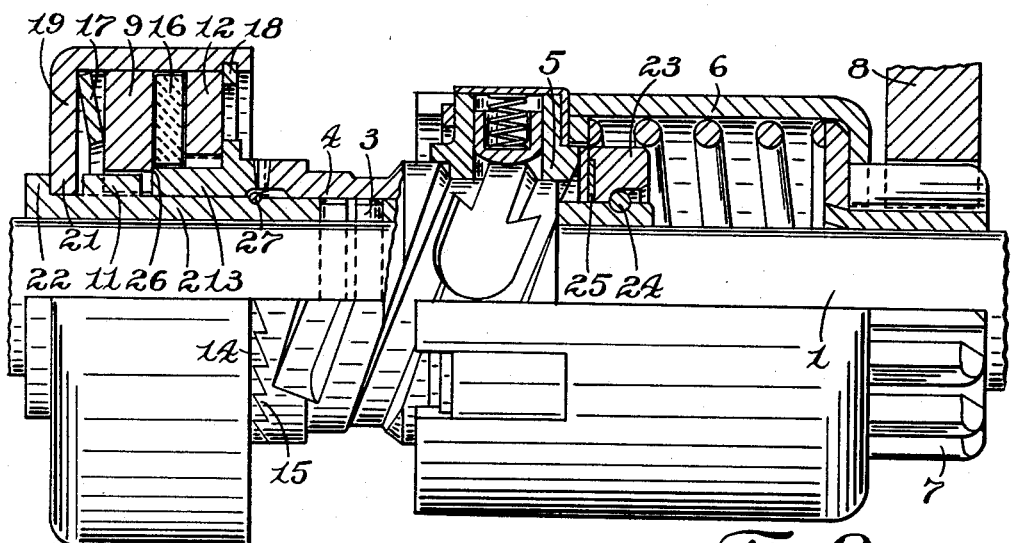

Further objects and advantages will be apparent from the following description taken in connection with the accompanying drawing in which:

Fig. 1 is a side elevation, partly broken away and in section, of a preferred embodiment of the invention showing the parts in normal or idle position; and Fig. 2 is a similar view showing the parts in cranking position.

In Fig. 1 of the drawing there is illustrated a motor shaft 1 on which a sleeve 2 is rigidly mounted as by means of a cross pin 3. A hollow screw shaft 4 is slidably journalled on the sleeve 2, and has a control nut 5 threaded thereon which is connected by a barrel member 6 to a pinion 7 slidably journalled on the power shaft 1 for movement into and out of mesh with an engine gear 8.

A driving coupling member 9 is splined on the sleeve 2 as indicated at 11, and a driven coupling member 12 is splined on a collar member 13 which is slidably journalled on the sleeve 2, and is provided with overrunning coupling teeth 14 adapted to cooperate with similar teeth 15 on the adjacent end of the screw shaft 4.

A disc member 16 of suitable frictional material is interposed between the driving coupling member 9 and the driven coupling member 12, and the coupling members are maintained under compression by means of a spring washer 17, the coupling members and spring washer being held under such compression by means of a lock ring 18 seated in the open end of a cup member 19 enclosing the coupling members and having a flange 21 in abutting relation with a flange 22 on the end of the sleeve 2. It has been found that the metal-ceramic friction material known as "Cerametallic" and disclosed in the patent to Stedman et al. 2,784,105 is particularly well adapted for this use.

A stop collar 23 is located on the opposite end of the sleeve 2 by means of a lock ring 24, and serves to limit the travel of the control nut 5 on the screw shaft 4 in the meshing direction. A light compression spring 25 interposed between the stop collar 23 and the screw shaft 4 serves to normally maintain the overrunning coupling teeth 14, 15 in engagement.

The coupling spring 17 is so designed in relation to the dimensions of the cup member 19 and the location of the lock ring 18, that the coupling members 9, 16, 12 are so compressed as to be capable of transmitting substantially more torque than necessary to perform the cranking operation. According to the present invention, means are provided for partially relieving the pressure on the coupling members in response to the transmission of the cranking torque and proportionately to said torque so as to accurately limit the torque capacity of the coupling to a predetermined value. As here illustrated, this is accomplished by taking advantage of the screw-jack action of the screw shaft and control nut under cranking load. For this purpose, the collar 13 is arranged to abut against the driving coupling member 9 as indicated at 26 to thereby transmit the backward thrust of the screw shaft 4 to the driving coupling member 9 and thus oppose the pressure of the spring 17. Movement of the collar 13 in the meshing direction is preferably limited by a lock ring 27 seated in the sleeve 2, and received in counterbores in the collar 13 and the adjacent end of the screw shaft 4.

In operation, starting with the parts in the positions illustrated in Fig. 1, rotation of the power shaft 1 in the direction of the arrow is transmitted through the coupling 9, 16, 12 to the collar 13 and through the overrunning coupling teeth 14, 15 to the screw shaft 4 whereby the control nut 5 with the barrel member 6 and pinion 7 are traversed to mesh the pinion with the engine gear 8, the meshing movement being limited by the stop collar 23. The screw shaft 4 is then moved backward by screw-jack action as the cranking load is assumed by the drive, compressing the overrunning coupling teeth 14, 15 and producing a backward thrust on the collar 13 which is transmitted to the driving coupling member 9. If the predetermined maximum torque is exceeded at the initiation of the cranking operation, the pressure of the collar 13 against the driving coupling member 9 releases the coupling members sufficiently to permit slippage. Since however the thrust of the collar 13 is proportioned to the torque being transmitted, it will be appreciated that the break-away torque will be reduced and a comparatively constant torque will be transmitted during slippage in spite of those factors such as lubrication, heat and wear which commonly cause variation in torque capacity of conventional frictional couplings.

Although but one form of the invention has been shown and described in detail it will be understood that changes may be made in the design and arrangement of the parts without departing from the spirit of the invention.

We claim:

1. In an engine starter drive a power shaft, a screw shaft slidably and rotatably mounted thereon, a control nut threaded on the screw shaft, a pinion slidably journalled on the power shaft for movement into and out of mesh with an engine gear, a barrel member connecting the control nut and pinion, and means for rotating the screw shaft from the power shaft including a friction coupling, yielding means for compressing said couplings, and means responsive to the screw-jack action of the screw shaft and control nut under cranking load for proportionately relieving the pressure of the yielding means on the coupling.

2. An engine starter drive as set forth in claim 1 in which said friction clutch includes a driving coupling member slidably but non-rotatably connected to the power shaft, means yieldably urging the driving coupling member in the meshing direction, a driven coupling member, means preventing movement of the driven coupling member in the meshing direction, means transmitting rotation of the driven coupling member to the screw shaft, and means whereby the screw-jack action of the screw shaft and control nut urges the driving coupling member in the demeshing direction away from the driven coupling member.

3. An engine starter drive as set forth in claim 2 in which the means for preventing movement of the driven coupling member includes a cup-shaped casing enclosing the coupling members and the yielding coupling closing means, having means normally maintaining the coupling members under compression, and the means for transmitting rotation of the driven coupling member to the screw shaft includes a collar member slidably and rotatably mounted on the power shaft in abutting relation to the driving coupling member, having an overrunning coupling and thrust connection to the screw shaft.

References Cited in the file of this patent
UNITED STATES PATENTS

| | | |
|---|---|---|
| 2,235,121 | Sekella | Mar. 18, 1941 |
| 2,304,241 | Buxton | Dec. 8, 1942 |
| 2,815,669 | Mendenhall | Dec. 10, 1957 |